Figure 1:
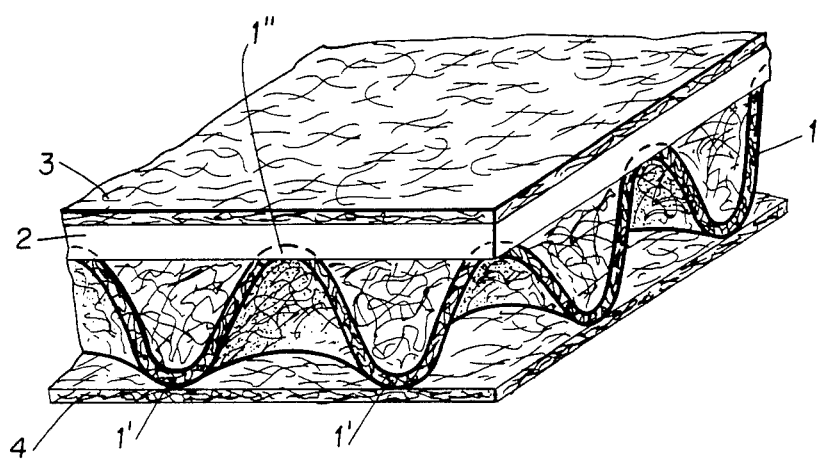

United States Patent [19]

Schwarzkopff et al.

[11] Patent Number: 4,502,415
[45] Date of Patent: Mar. 5, 1985

[54] FLOOR COVERING FOR STABLES

[75] Inventors: Udo Schwarzkopff; Horst Fischer, both of Wuppertal, Fed. Rep. of Germany

[73] Assignee: Akzona Incorporated, Enka, N.C.

[21] Appl. No.: 458,605

[22] Filed: Jan. 14, 1983

[30] Foreign Application Priority Data

Jan. 14, 1982 [DE] Fed. Rep. of Germany ... 8200677[U]

[51] Int. Cl.³ .......................... A01J 1/00; B32B 27/06
[52] U.S. Cl. ...................................... 119/28; 428/224; 428/284; 428/286; 428/288; 428/296; 428/332; 428/186; 428/291
[58] Field of Search ............... 428/186, 291, 119, 180, 428/224, 284, 286, 288, 296, 332; 119/28

[56] References Cited

U.S. PATENT DOCUMENTS

| 25,111 | 8/1859 | Goodyear | 428/291 |
| 4,007,309 | 2/1977 | Sewell | 428/186 X |
| 4,129,097 | 12/1978 | Schwartzkopff | 428/288 X |
| 4,286,006 | 8/1981 | Boelter | 428/186 X |

Primary Examiner—George F. Lesmes
Assistant Examiner—Nancy A. B. Swisher
Attorney, Agent, or Firm—David M. Carter; Jack H. Hall; Francis W. Young

[57] ABSTRACT

Floor covering material for stables, in particular for tie-stall cowsheds, consisting of a top layer impermeable to moisture and a compressible central layer, the underside showing a honeycomb-like structure, having hump-like projections on the surfaces thereof and a fabric attached to the humps of the honeycomb structure is arranged on the back of the matting.

6 Claims, 1 Drawing Figure

FLOOR COVERING FOR STABLES

The invention relates to floor covering for stables, specifically for tie-down stables, consisting of a top layer impervious to moisture, a fabric bottom layer and a compressible central layer. The central layer is a matting composed of a plurality of intersecting filaments of 0.4 to 2.5 mm diameter fused together at points of intersection, one of the two surfaces thereof being partly embedded in the moisture-impervious top layer and with at least one surface, specifically the surface facing away from the top, exhibiting a honeycomb-like structure, having hump-like projections spaced on at least one surface thereof.

A stable floor covering of this type has been described in U.S. Pat. No. 4,129,097. However, it was found that when using the floor covering described therein in tie-down cubicles, the nearly punctiform load produced by the small contact surface of the hoof or claw of the animal caused the humps of the matting facing the ground to spread apart or even partly collapse in the load area. Since in tie-down stables the animals stand from 8 to 12 hours in their cubicles, the high load produces a permanent deformation of the matting humps. As a result, the recovery of the bottom layer is impaired especially in the areas of hoof contact. Furthermore, the high load causes stretching of the sub-layer leading to wrinkling of the surface of the floor covering for stables. Moreover, a wrinkled surface interferes with the cleaning of the matting.

According to said U.S. Pat. No. 4,129,097, it was furthermore proposed to increase anti-slip properties by applying to the moisture-impervious top layer a synthetic filament or fiber web. It was determined, however, that the wear-resistance of such web was too low for use in tie-down cubicles.

The subject matter of this invention is to make available a floor covering for stables of improved bottom layer recovery and/or improved wear resistance and improved dimensional stability of the matting composite. This is accomplished, according to the invention, by providing the underside of the matting with a synthetic filament or fiber fabric connected with the humps of the honeycomb structure. This should largely prevent collapsing or spreading of the humps facing the stable floor while loaded, increase the recovery of the back layer and improve dimensional stability.

This fabric is preferably a spun web. This spun web, consisting of synthetic filaments or fibers and being essentially flat, can be applied, e.g., by the process described in U.S. Pat. No. 4,212,692. But, the spun web may also be connected with the humps at the back side of the matting by needle punching with adhesives or fusing. Filaments or fibers of very low count are eminently suitable for said web. The thickness of the web is normally up to a few millimeters, e.g., 0.5 mm–2 mm.

Wear resistance of the surface is enhanced by applying to the moisture-impervious top layer a coating of synthetic rubber reinforced with synthetic filaments or fibers. Polychloroprene latex has been found eminently suitable for this. A filament or fiber component of 40 to 60 wt. % ensures that the surface of the latex coating contains sufficient filaments or fibers to provide anti-slip properties.

The synthetic filament or fiber-reinforced synthetic rubber coating can be applied, for example, by bonding a latex-impregnated web with adhesive or by fusing it to the moisture-impervious layer; or else latex mixed with synthetic filaments or fibers can be coated on the moisture-impervious top layer. Polychloroprene latex is an eminently suitable latex. The synthetic rubber layer need only be a few millimeters, e.g., 2 mm, thick. The moisture-impervious top layer may consist of, e.g., soft thermoplastic elastomers, such as PVC or ethylenevinyl-acetate.

As regards the production, construction characteristics and dimensions of the floor covering for stables according to the general concept of the present invention, reference is made to the above-mentioned U.S. Pat. No. 4,129,097. Likewise, the definitions employed in this patent are also applicable. Depending on end-use, the floor covering for stables of the invention can be supplied in rolls or pre-finished.

The invention is explained in detail by reference to the drawing. FIG. 1 shows one example of a floor covering for stables according to the invention.

In FIG. 1 a compressible central layer 1 is a matting comprising a multitude of intersecting filaments fused together at points of intersection having a honeycomb-like structure, humps 1' on the underside of the honeycomb-like structure and humps 1" on the upper side of the honeycomb structure 1. The top humps 1" of matting 1 penetrate a moisture-impervious top layer 2. This top layer may be composed of, e.g., soft PVC. The humps 1' are fused to a flat spun web 4 consisting of synthetic fibers. A synthetic-fiber-reinforced polychloroprene latex coating 3 with a fiber component of about 50 wt. % is bonded by fusion to the moisture-impervious layer 2.

The floor covering for stables may either be supplied as roll goods or as mats, depending on end use. If the area to be covered is small or if there are many corners, posts or columns, mats are preferable. If matting has to be cut out to fit around a post or if several mats are laid side-by-side, they can be bonded by means of a fusion adhesive.

The floor covering for stables as roll goods can be readily rolled up with web 4 facing the inside.

The floor covering for stables may also be composed of two elements as described, e.g., in U.S. patent application Ser. No. 261,335, now abandoned.

The filaments or fibers of web 4, of the compressible layer 1 and of latex layer 3 consist of synthetic polymers. Compressible layer 1 is preferably composed of polycaprolactam because of its good elasticity and high resistance to decay; web 4 and the fibers of the latex layer 3 are preferably composed of polyethylene terephthalate because of the good abrasion strength, high resistance to decay and low moisture uptake. However, other synthetic polymers may be used for the filaments or fibers.

The fiber-reinforced layer of polychloroprene latex 3 can be obtained, e.g., by immersion of a spun synthetic fiber web into an aqueous polychloroprene latex dispersion, with subsequent squeezing off and drying. The bond between the moisture-impervious top layer 2 and the fiber-reinforced latex layer 3 can be obtained by fusion-adhesion.

We claim:

1. A floor covering for stables comprising: a top layer impervious to moisture, a bottom fabric layer and a compressible central layer, said central layer including a matting having a plurality of intersecting filaments with a diameter of from 0.4 to 2.5 mm, fused together at said points of intersection, and with at least one surface exhibiting a honeycomb-like structure having a plurality of rows and columns of humps thereon, each of said humps being spaced apart from each other, the upper surface of said compressible layer being partly embedded in said moisture impervious top layer, and said fabric being formed from synthetic filaments or fibers, said fabric being connected with said humps of said honeycomb structure.

2. The floor covering of claim 1, wherein said fabric is a spun web.

3. The floor covering of claim 1, wherein a synthetic filament or fiber-reinforced synthetic rubber layer is applied to said moisture-impervious top layer.

4. The floor covering of claim 3, wherein said synthetic rubber is a polychloroprene latex.

5. The floor covering of claim 4, wherein the synthetic rubber layer contains from 40 to 60 wt. % of filament or fiber components.

6. The floor covering of claim 3, wherein the synthetic rubber layer contains from 40 to 60 wt. % of filament or fiber components.

* * * * *